March 16, 1948.  A. R. BURGESS  2,437,679
MULTIPLE SNAP GAGE
Filed Nov. 21, 1945  2 Sheets-Sheet 1

Inventor,
Archie R. Burgess
By J. H. Church & F. E. Thibodeau
Attorneys.

March 16, 1948. A. R. BURGESS 2,437,679
MULTIPLE SNAP GAGE
Filed Nov. 21, 1945 2 Sheets—Sheet 2
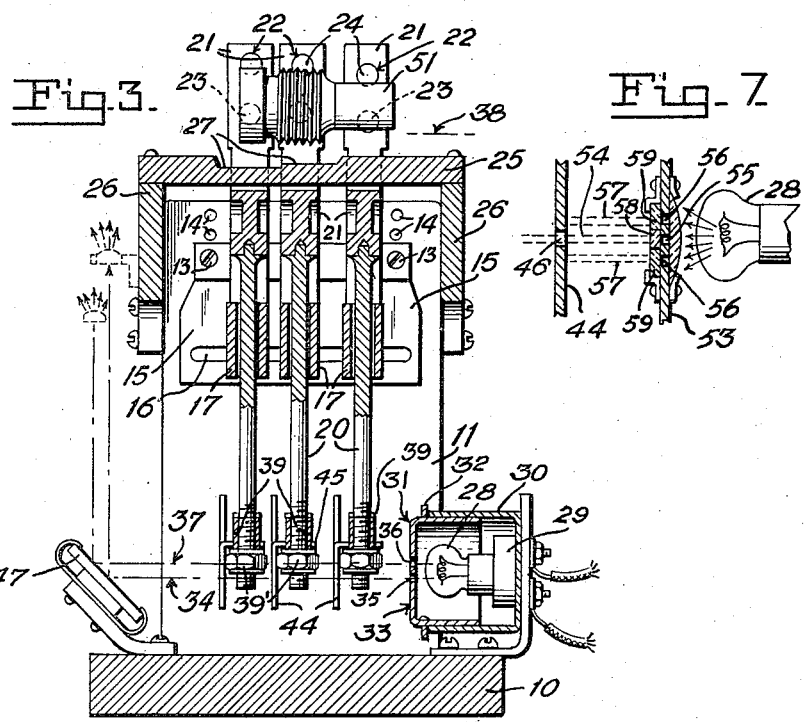
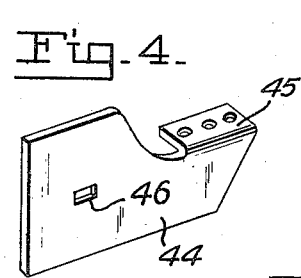
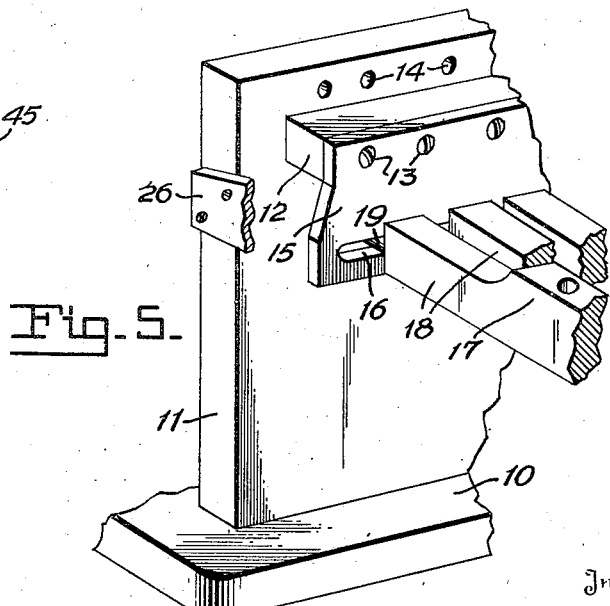
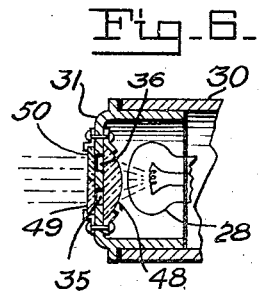
Inventor
Archie R. Burgess
By J. H. Church & H. E. Thibodeau
Attorneys Patented Mar. 16, 1948

2,437,679

UNITED STATES PATENT OFFICE 2,437,679

MULTIPLE SNAP GAGE

Archie R. Burgess, St. Louis, Mo.

Application November 21, 1945, Serial No. 630,103

9 Claims. (Cl. 33—168)

(Granted under the act of March 3, 1883, as amended April 30, 1928; 370 O. G. 757)

The invention described herein may be manufactured and used by or for the Government for governmental purposes without the payment to me of any royalty thereon.

The invention has for an object to effect improvements in the construction of mountings for snap gages, to the end that a minimum of movements will be required on the part of personnel in testing articles for variation from standard size specifications. It is a highly important aim of the invention to present means which will be effective to automatically indicate "go," or "no go" in case a piece having several required dimensions fails in any of these to meet the specification. A further important aim is to obviate requirement on the part of operating personnel to handle gages manually, and to enable the rapid application of gages to the work.

A further important purpose of the invention is to present a specific construction which will be liable in a minimum degree to derangement by wear and displacement of parts incident to normal use.

A further aim is to present a novel means for registering the acceptability or non-acceptability of parts under test. A further aim is to present a construction having novel functional advantages of special value in testing operations.

Additional objects, advantages, and features of the invention reside in the construction, arrangement and combination of parts involved in the embodiment of the invention as will be apparent or understood from the following description and accompanying drawings, wherein:

Figure 3 is a cross section view on the line 3—3 of Figure 1;

Figure 4 is a detail of one of the shutter blades;

Figure 5 is a fragmentary perspective detail of the mounting of the guides;

Figure 6 is a fragmentary section of a modification;

Figure 7 is a similar view of a further modification.

Figure 1:
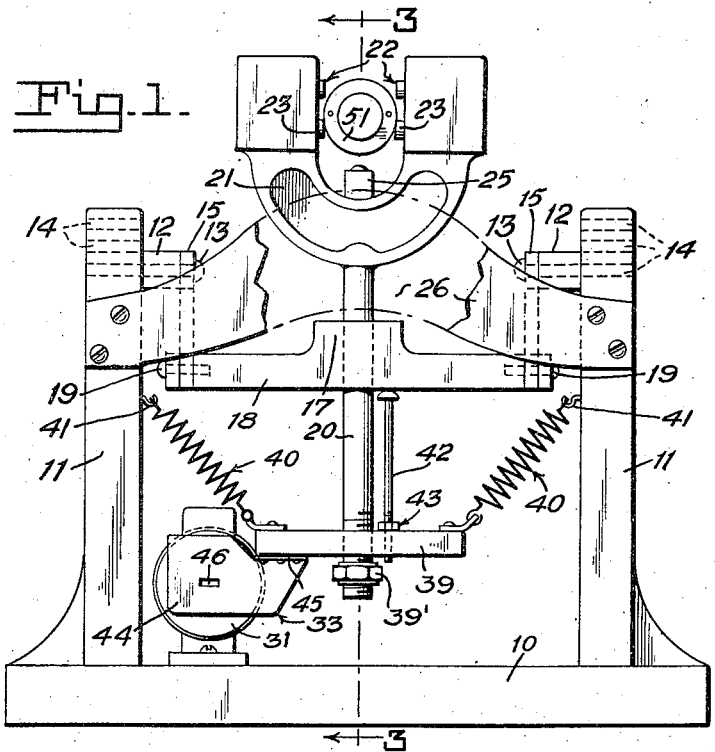
Figure 1 is a right end elevation of a machine constructed in accordance with my invention, with the beam reflecting mirror removed.

Referring more particularly to the drawings, there is illustrated a machine comprising a base plate 10, upon which standards 11 are erected at each side, which may be walls integrally formed on the base with appropriate bracing webs, these walls being planiform and parallel. Horizontal brackets in the form of bars 12 are secured by bolts 13 to the inner sides of these walls, a series of vertically spaced threaded openings 14 being provided in the walls to enable adjustment of these bars at various heights according to the nature of the work to be tested. The inner faces of these bars are planiform, vertical and parallel, and have secured thereto respective hanger plates 15 held by the same bolts 13 which secure the brackets 12 in place. The lower parts of these hangers are broadened and formed each with a horizontal slot 16 extending fore and aft the full length of the bracket.

A plurality of guides 17 is shown, each consisting of a horizontal bar 18 with planiform ends abutting respective hangers 15 and adjustable slidably therebetween along the slots 16. Each bar is drilled and tapped on its ends to receive a headed mounting bolt 19 which is engaged through the slot 16 from the outside and screwed in the end of the bar to clamp the slotted portion of the hanger to the bar. Each bearing member is vertically bored and receives slidably therethrough a plunger 20 carrying at its upper end a C yoke 21 having vertical arms each of which has mounted on its inner side a respective pair of upper and lower gage pins 22 and 23 having end lands 24 for engagement with surfaces of interposed work. The pins at one side of the yoke are aligned with corresponding pins at the opposite side in the present instance, although this is not arbitrary. It is also not arbitrary that opposed pins be used, and in certain of the yokes a single pin may be used in one or more gages, should the nature of the work require or permit.

In the present instance the machine is shown embodied for use upon a work piece 51 which happens to be circular in cross section, with a longitudinal axis concentric with the circular parts, the diameters at different places in the length of the article being different.

Each gage in the present instance has its upper pins 22 spaced from each other a distance equal to a maximum diameter tolerance, and the lower ones spaced a distance which is less than the minimum diameter tolerance, so that a perfect piece 51 will engage these lower pins at points subtending radii of some required angular relation which is not arbitrary for all work, but may be selected for its best effect with the particular shape of the piece. The several gages are so arranged and spaced that a work piece may be laid across all three of the gages shown in the present instance and each perfect piece will engage the lower pins on radii in required angular relation.

However, should the piece be too small in any one particular, the lower pins 23 of the corresponding gauge may not be engaged or—if engaged—will be relatively higher when the piece reaches a stopped position; or if two or all parts are too small, two or all gages will be relatively higher when the piece is stopped. On the other hand, should the work be too large, one or more gages will be held at a lower position relative to the axis of the piece, so that when the piece is stopped the one or more gages will have been pressed to lower positions than in the case of the perfect piece.

The space between the arms of the gage yoke is relatively deep, so that a considerable space is available within the yoke below the lower gage pins 23. A stop bar 25 is mounted to lie in the lower part of this space, carried on bridge brackets 26 at each end of the device, these bridge brackets having their ends secured to the vertical edges of the standards 11. The bar 25 is at a level to extend through the lower spaces within all the yokes 21, clearing the bights of the yokes when the latter are at their uppermost positions incident to normal use. The upper side of the bar is shaped to correspond to the longitudinal contour of the work piece to be tested, so that the work piece 51 will be stopped in resting engagement with the bar after all of the gages have been engaged and pressed downward a distance. This conformation of the bar 25 may include two or more stop face portions 27 at elevations such as to engage the work while the axis of the work across the gages is horizontal. In the present instance three work engaging surfaces 27 are shown, and they are so related as to commonly engage respective longitudinally spaced parts of a perfect piece of work. In consequence, it will be seen that if the work piece is deficient in diameter at one point it will be supported by the other two surfaces 27 if they are standard. But should all parts of the work vary from standard, the average difference of standard measurements will ordinarily be slight and immaterial in the operation of this device so that the axis of the piece will be near to an arbitrary line. The rest surface 27 will require to be so shaped and positioned according to the shape and size of the work as to support the work in a position convenient for movement of the work to and from testing position.

On the base plate 10 at the right hand side as viewed in Figure 3, and adjacent the inner side of the far standard 11 (which is at the left in Figures 1 and 2), a light source 28 is provided consisting of an electric lamp with a conventional socket mounting 29, inclosed in a case 30 having a removable cover 31 of opaque material. In the present instance the case 30 is cylindrical in form on a horizontal axis, and the cover telescopes therewith, having stops 32 engaging the lip of the case to stop the cover at the proper position relative to the lamp. This cover has a planiform front wall 33 normal to a horizontal central beam 34 from the lamp, and an axial aperture or slot 35 is formed through the wall 33 to pass this beam. A second aperture 36 is formed in the wall 33 at a short distance above the first one so that a second parallel beam 37 is projected from the lamp through the cover. These beams are parallel to the axis 38 determined for the work piece when at stopped position on the bar 25 although such parallelism is not essential.

Each of the plungers 20 is extended downwardly a distance below the guide bearings 17, and has secured thereon for vertical adjustment a horizontal cross bar 39 which may be vertically bored at its middle and threaded to receive the threaded lower part of the plunger screwed therethrough. These bars are of a length considerably less than the distance between the standards 11 and have connected to respective ends support springs 40 which extend diagonally upward and outward to anchorages 41 on respective standards 11, the strength of the springs being proportioned to the weight of that part of he work which is to be engaged by the respective gage pins in the yoke carried by the respective plunger, so as to support the gage at an upper initial position, but to yield to the work so that the latter may move by manual pressure or gravity to engagement with the stop bar 25. In order to limit the initial position of the gage, a stud screw 42 is engaged through the bar near the plunger and parallel thereto, a headed end of the screw extending upwardly beneath the bearing 17, so as to engage the latter as a stop. A lock nut 43 is engaged on the screw against the bar to hold the screw in adjusted positions. A lock nut 39' is also engaged on the plunger to bind on the bar 39 at adjusted positions. The bar 39 stops short of a vertical plane coincident with the beams 34 and 37 and has attached thereto a planiform shutter plate 44 extending in a plane normal to the beams and across the same a suitable distance in all directions. The shutters have upper inner end portions bent at right angles on a horizontal line intermediately of the height of the shutter to form a horizontal attaching flange 45 which is secured to the under side of the bar 39. The shutters are provided midway of their heights with apertures 46 of a size to include the beams 34 or 37 alternately at respective positions in the sliding movement of the plunger 20. The use of the two beams is not arbitrary for the simplest application of the invention, and if desired a single aperture such as the one 35 may be formed in the lamp housing cover so that a single beam 34 only is utilized.

At the far side of the base 10 from the lamp in the direction of projection of the beam, a planiform reflector 47 is mounted at an angle of forty-five degrees more or less, to the beam and to a vertical reflection thereof, so that the beams may be readily observed from above, or may be utilized adjacent the level of the bar 25 to illuminate a screen, bullseye, or photo-responsive control or signal device.

In order to more definitely focus the rays from the lamp to produce the beams 34 and 37, and to distinguish between two beams for certain purposes, a construction as illustrated in Figure 6 may be employed, wherein the cover 31 has mounted upon its inner side a lens or lens system—in the present instance a simple collimating lens 48 being indicated—which is adapted to focus rays divergent from the filament of the lamp and refract them to parallel relation. On the front of the wall 33' a pair of filters 49 and 50 are mounted before the apertures 35 and 36 respectively, the first being adapted to pass green light, while the second will pass red rays.

If desired, gages may be included which will measure length or distance between shoulders, depths and other contours, as will be appreciated.

In the use of the invention, the pins 23 are so adjusted that when engaged with a standard work piece 51 and the latter has been lowered to rest upon the bar 25, the apertures 46 of all shutters will be registered with the beam 34 from the lamp, in either form of the device illustrated, and for this use the single lower aperture may be employed alone, if desired. In such case, should the work piece vary more than a tolerable degre in either direction from the specification relating to any one of the several dimensions for which the gages are set, the respective shutter will be positioned with its aperture above or below the beam, so that the operator will not see any manifestation of light from the lamp device, if only the one beam 34 is used, or if the beam is utilized to operate a photo relay of any kind, there will be no response tending to pass the work. In order to attain this function in the device the apertures in the shutters must have a vertical dimension corresponding to the range of tolerance decided upon, and the aperture in the cover of the lamp casing must also project a beam of corresponding measurement vertically.

In the use of the device with the two parallel beams, the beam 37 may be so located with respect to the beam 34 that only the beam 34 will be included within the shutter apertures when aligned at lower stopped positions in engagement with the work, indicating a perfect work piece, in which event the light passed will be green. At initial positions of the gages, the screws 42 being adjusted to stop the plungers and gages in similar relative positions with the shutter apertures at a level with the upper beam, the operator will understand that the gages and shutters are in proper initial positions if light from the upper beam is observed, and by using appropriately colored diverging lenses or other scattering or diffusing means with respective filters the operator can readily tell whether the device is in free condition and the parts in proper relative arrangement when he sees one color of light. After placing of the work in the gages and movement to the stop 25, he will perceive by a different colored light that the piece is properly proportioned. Should the work fail to fall within the established limits of tolerance the shutter apertures will be either so displaced relatively that no rectilinear beam can pass, or will all be above or below the beam, with the same effect.

Figure 2:
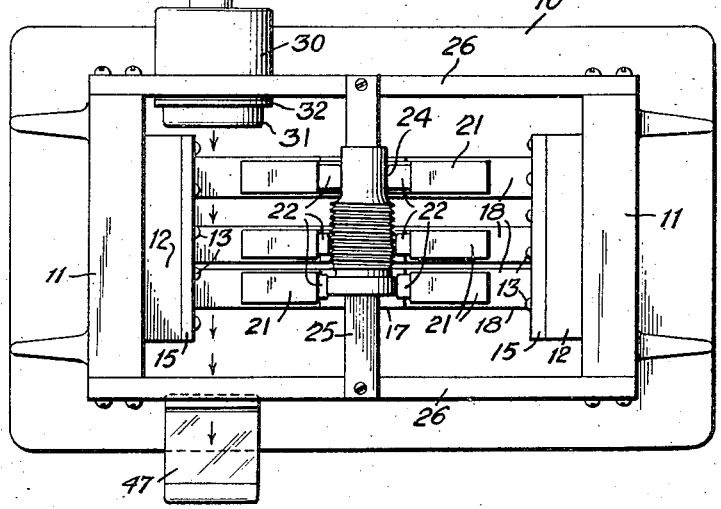
Figure 2 is a top view thereof; the mirror in place.

Other manners of use of the plural beam device may be devised, as may be understood. Thus, three vertically spaced apertures may be formed in the cover wall 53 as in Figure 7, the middle one 55 corresponding to the aperture 35 of Figures 3 and 6; while upper and lower apertures 56 are located close to the middle one. They may be of similar shape, and are shown as of the same vertical dimension as the middle aperture although this is arbitrary. The apertures of the shutter may be of sufficient vertical dimension to include a portion of the middle beam and also a portion of the uppermost or lowermost one if the shutter aperture center is above or below the center line of the middle beam. By passing the middle beam through a green filter 57 and the uppermost and lowermost beam through red filters 58, in case of variation of the work from standard, the resultant signal light observed by the operator will have components of red proportionate to the error. A pure green will then indicate a perfect piece, and a pure red an intolerable piece. By the use of a chart of graduated mixtures of pigments adapted to reflect various proportions of red and green light, grading of work may be effected for sorting according to the amount of correction required. Work might be regarded as passable if a slightly modified green is manifest, but when the modification exceeds the red component indication of a given chart color it would be sorted into a lot for a certain reworking, indicated by the part of the chart matched.

Where two sets of gage pins are used as in Figure 1, in case work with an over size part is encountered, it will be engaged by the uppermost two pins of the gage, moving the latter to an extreme low position, out of line with the other two to an extreme degree, and this being observable at once by the operator, the piece may at once be discarded without further care in gaging. When a gage with these upper two pins as well as the lower two pins is employed, the lower two may be used solely to detect under size work, and so may be set near to the maximum diameter for the respective part of the piece so that the perfect piece will be engaged just below and very close to a horizontal diameter of the part engaged, but will permit the work to pass between the lower pins if of less than the minimum permissible diameter. The work would then drop to the stop bar 26 without lowering the gage from its initial position. With a single beam the latter would then remain interrupted by the shutter of this gage even if the other two engaged work parts were of proper size and moved the respective shutters to align their apertures with the beam.

As has already been indicated the single set of lower pins 23 may be used alone with large circular work to select work pieces meeting tolerance requirements, and in such case the pins may be adjusted in the same way as last described, so that work parts too small will drop between the pins leaving the respective shutters high; a standard part will depress the shutter into line with the beam but an over size part will depress the gage so that the aperture of its shutter will be below the beam, interrupting the latter in either the first or last mentioned case.

Where weight of the work is an important factor, the springs 46 may be proportioned to support a piece of correct weight at a test position corresponding to the line 38, and the bar 25 omitted. In such event, a work piece of correct external proportions and weight would come to rest with all shutter openings aligned with the beam 34 or 54, but if too heavy or too light beyond tolerance the shutters would interrupt the beam so that the "go" light would not be seen. When the operator notes the absence of the "go" light or green beam, he may discover what part is faulty by observing which shutter is out of registry with the beam, and may classify the reject accordingly, if correctional practice is followed.

In order to adjust the device for operation, a work piece 51 of perfect form and size is adjusted on the rest bar 25, and the pins 23 adjusted so as to engage the lower part thereof at the desired points while the work piece is upon the stop 25. The bar 39 of each plunger is then adjusted upon its respective plunger upwardly or downwardly, until the apertures of all the shutters are horizontally aligned with the beam 37, or 57 as the case may be. With the single aperture 35 and the apertures of the shutters properly proportioned, the device will then operate in the manner first described.

While I have disclosed my invention with particularity in the best form which I have constructed the same, it will nevertheless be understood that this is exemplary, and that changes in the construction, arrangement of parts, substitution of materials and equivalents, mechanical or otherwise may be made without departing from the spirit of the invention more particularly set forth in the appended claims, wherein I claim:

1. A gage device comprising a plurality of combined maximum and minimum snap gages for a given work piece of required external cross sectional measurements at longitudinally spaced parts, means to support the gages for independent sliding movement with an engaged work piece translatively in a direction normal to a predetermined axis of the piece, a light source spaced laterally from said axis and control means operatively connected with said gages constructed and cooperative with said light source to pass a beam therefrom in response to engagement of the gages with a standard size work piece at a given position in said sliding movement, and to interrupt at least a part of the beam at other positions of the control means.

2. The structure of claim 1 in which said light source is a constantly energized one, said means cooperative with said light source comprising respective apertured shutter devices on each gage positioned to intercept a given beam from said source at all positions of the gages in said sliding movement other than an approximate arbitrary one, means normally operative to move the gages from said position opposite the direction of entry of the work, said gages comprising each opposed upper lands arranged to clear diametrically opposite points of the work when laid therebetween with the axis of the work normal to a vertical plane through the points, and opposed lower lands in the same said plane spaced less than adjacent said points so as to engage the work of standard size when at a predetermined gaging position and the apertures of the shutters are aligned with the beam.

3. The structure of claim 1 in which said light source is a constantly energized one, said means cooperative with said light source comprising spective apertured shutter devices on each gage positioned to intercept a given beam from said source at all positions of the gages in said sliding movement other than an approximate arbitrary one, means normally operative to move the gages from said position opposite the direction of entry of the work, said gages comprising each opposed lands spaced less than diametrically opposite points of the work when laid therebetween with the axis of the work normal to a vertical plane through the points, so as to engage the work of standard size when at a predetermined gaging position and the apertures of the shutters are aligned with the beam, said light source comprising a lamp, an enclosure therefor having two apertures arranged to pass separate beams of light across the paths of the shutters, said shutters being apertured so as to pass light from respective beams alternately in movement of the work by lateral translation of its axis while engaged with the gages adjacent respective limits of tolerance in varying engagement of the said lower lands with the work.

4. A gage of the character described comprising a fixed light source arranged to project a beam in a given path, a plurality of parallel guides spaced from said beam, respective gage carriers mounted therein for independent reciprocation, respective gages thereon presented in a common direction constructed and arranged to receive a work piece thrust translatively thereagainst and to fit the same at stages of relative movement of the work according to variation from or agreement of respective dimensions of the work parts with required arbitrary specifications for such parts, yielding means to hold the gages at predetermined initial positions, stop means in the path of translation of work on the gages, and respective shutters connected with the gages extending across said beam and of a size to intercept the beam throughout a given movement of the gages, each said shutter having an aperture therein positioned so as to register with the beam when the respective gage is engaged by a standard work piece at said stop means.

5. A gage device comprising a plurality of fixed vertical guides, separate gage units including respective rectilinear plungers slidable in said guides and respective gages on the upper ends of the plungers, resilient support means for each gage unit, a stop for each gage at a predetermined height to oppose the resilient support means, said gages having gage surfaces adapted to various contours of work to be gaged so as to fit thereagainst when at a predetermined gaging position of the work, means to stop the work at said position when moved in common engagement with the gages, a light source arranged to project a beam in a horizontal plane, said units each including fixed therewith a shutter plate extended across said beam and having an aperture positioned to register with the beam when the respective gage is engaged by a work part of standard measurement at said gaging position.

6. The structure of claim 5 wherein said guides are in a common plane, said shutters comprising planiform plates set in a plane coincident with their movement with said units, an outer end part of each being of an extent greater than said movement and set across said beam, said end part being centrally apertured to register with the beam as described, said plungers having cross members at their extremities distant from the gages, the inner parts of said shutter plates being fixed on the cross members, said stop for each gage comprising a screw parallel to the direction of reciprocation of the plunger, engaged adjustably in the cross member and arranged to engage at its distal end against the guide.

7. The structure of claim 5 wherein said resilient support means comprises at least two springs connected at opposite sides of each plunger extended in a radial plane and inclined in a direction to oppose cumulatively movement of the gage units on said guides under pressure of work upon the gages.

8. A gage of the character described comprising a fixed light source, arranged to project a beam in a given path, a plurality of parallel guides spaced from said beam, respective gage carriers mounted therein for independent reciprocation, respective gages thereon presented in a common direction constructed and arranged to receive a work piece thrust translatively thereagainst and to fit the same at stages of relative movement of the work according to variation from or agreement of respective dimensions of the work parts engaged with required arbitrary specifications for such parts, yielding means to hold the gages at predetermined initial positions, and respective shutters operatively connected with the gages extending across said beam and of a size to intercept the beam throughout movement of the gages, each said shutter having an aperture therein positioned so as to register with the beam when the respective gage is engaged by a standard work piece at a predetermined gaging position, said yielding means being constructed to support the gage units and said work of standard weight with the latter at said gaging position whereby weight of the work will additionally control signals transmitted by the beam.

9. The invention recited in claim 1 and including means for longitudinally adjusting the relative distances of respective adjacent gages to conform to respective transverse dimensions of a work piece to be tested.

ARCHIE R. BURGESS.

REFERENCES CITED

The following references are of record in the file of this patent:

UNITED STATES PATENTS

| Number | Name | Date |
|---|---|---|
| 2,002,679 | Schoof | May 28, 1935 |
| 2,086,153 | Bickel | July 6, 1937 |
| 2,197,204 | Cooper | Apr. 16, 1940 |
| 2,242,131 | Johnson | May 13, 1941 |
| 2,320,720 | Croft | June 1, 1943 |
| 2,415,179 | Hurley | Feb. 4, 1947 |
| 2,417,148 | Wright | Mar. 11, 1947 |

FOREIGN PATENTS

| Number | Country | Date |
|---|---|---|
| 321,742 | Germany | 1920 |